United States Patent [19]

Sandstedt

[11] Patent Number: 4,569,421

[45] Date of Patent: * Feb. 11, 1986

[54] RESTAURANT OR RETAIL VENDING FACILITY

[76] Inventor: Gary O. Sandstedt, 3837 Harrison Blvd., Kansas City, Mo. 64109

[ * ] Notice: The portion of the term of this patent subsequent to Nov. 15, 2000 has been disclaimed.

[21] Appl. No.: 523,562

[22] Filed: Sep. 22, 1983

Related U.S. Application Data

[63] Continuation of Ser. No. 207,744, Nov. 17, 1980, Pat. No. 4,415,065.

[51] Int. Cl.$^4$ ............................ E04H 3/04; G06F 3/02
[52] U.S. Cl. ..................................... 186/39; 235/383; 340/365 S; 364/401
[58] Field of Search ...................................... 186/38–41, 186/45–50, 53, 55, 56; 221/2, 5, 7; 235/91 L, 383, 385; 340/365 S; 364/401

[56] References Cited

U.S. PATENT DOCUMENTS

| | | | |
|---|---|---|---|
| 3,340,416 | 2/1967 | Wolf | 186/39 X |
| 3,814,285 | 6/1974 | Craig | 222/2 |
| 4,005,388 | 1/1977 | Morley et al. | 340/365 S X |
| 4,115,870 | 9/1978 | Lowell | 364/401 X |
| 4,128,757 | 12/1978 | Garner, Jr. | 235/383 |

FOREIGN PATENT DOCUMENTS

| | | |
|---|---|---|
| 1354935 | 5/1974 | United Kingdom . |
| 1424379 | 2/1976 | United Kingdom . |
| 1508441 | 4/1978 | United Kingdom . |
| 2015221 | 9/1979 | United Kingdom . |

OTHER PUBLICATIONS

*The Intelligent Terminal*, 1977, Systems Consultants Inc., San Diego, Calif.

Primary Examiner—F. J. Bartuska
Attorney, Agent, or Firm—Brady, O'Boyle & Gates

[57] ABSTRACT

Disclosed is a vending system particularly adapted for a restaurant or retail sales outlet which includes a hand held portable data entry terminal having an operator addressable, programmable memory containing a repertoire or library of sales or menu items addressable by entering a product code. The hand held terminal upon receiving an operator entered order entry, relays the order to an order filling station as well as to a local and remote data processor over a pollable wireless bi-directional communications link. An alpha-numeric print out of an order inputted to the hand held terminal and other transactional information is provided by the terminal as well as the local data processor. The programmable memory is adapted to be reprogrammed from a programmer either directly or remotely through the bi-directional communications link. Each terminal also includes wireless transceiver apparatus for bi-directional communications, e.g. paging, with a plurality of customer order stations containing like customer operated transceiver apparatus.

9 Claims, 13 Drawing Figures

RESTAURANT OR RETAIL VENDING FACILITY

This is a continuation of application Ser. No. 06/207,744, filed Nov. 17, 1980, now U.S. Pat. No. 4,415,065.

BACKGROUND INFORMATION

This invention relates generally to vending apparatus and more particularly to a vending system particularly adapted for a restaurant or retail facility.

While various types of interactive systems are known employing portable data entry devices which communicate with central data processing systems, these systems typically have been implemented for retail inventory replenishment and are accordingly limited for such use. Also, systems are known which include point of sale terminals which replace conventional cash registers for checking out multiple items such as articles in a grocery store or the like. Such systems are used to tally the items purchased and to provide a printed readout of the transaction, while at the same time relaying the necessary information concerned with the particular transaction to a central processor where in addition to inventory control; bookkeeping, payroll, general ledger and other functions are carried out. While these systems perform in the manner intended, they more or less have been limited in flexability and overall systems expediency.

It is an object of the present invention, therefore, to provide an improvement in vending apparatus.

It is another object of the present invention to provide an improved vending system particularly adaptable to being utilized in connection with a facility wherein paging of service personnel is desired.

Still another object of the present invention is to provide an improved vending system for use in a restaurant facility where a portable terminal is utilized for handling customer orders.

These and other objects of the present invention are provided for in accordance with a hand-held portable data entry terminal including, in addition to operator instructional means, a programmable memory containing stored data representative of sales or order items addressable by entry of a product code and which is accessed by means of a keyboard, bar code or OCR pick-up device. The portable terminal interacts with a local and remote data processor through a pollable interface and a bi-directional communications link selectively utilizing, for example, optical RF, audio and inductive energy. An alpha-numeric print out of an order inputted to the hand held terminal by an operator is provided along with other desired transactional information such as arithmetic calculations for purpose of billing. The programmable memory is adapted to be reprogrammed by an external programmer through a direct connection or a bi-directional communications link. Additionally, each terminal includes receiver indicator means for bi-directional paging communications from any number of a plurality of customer stations which contain respective customer operated bi-directional paging communications means of a selected energy type.

The invention is set forth in greater detail in the specification hereinafter following by reference to the accompanying drawings.

DESCRIPTION OF THE PREFERRED EMBODIMENT

Figure 1:
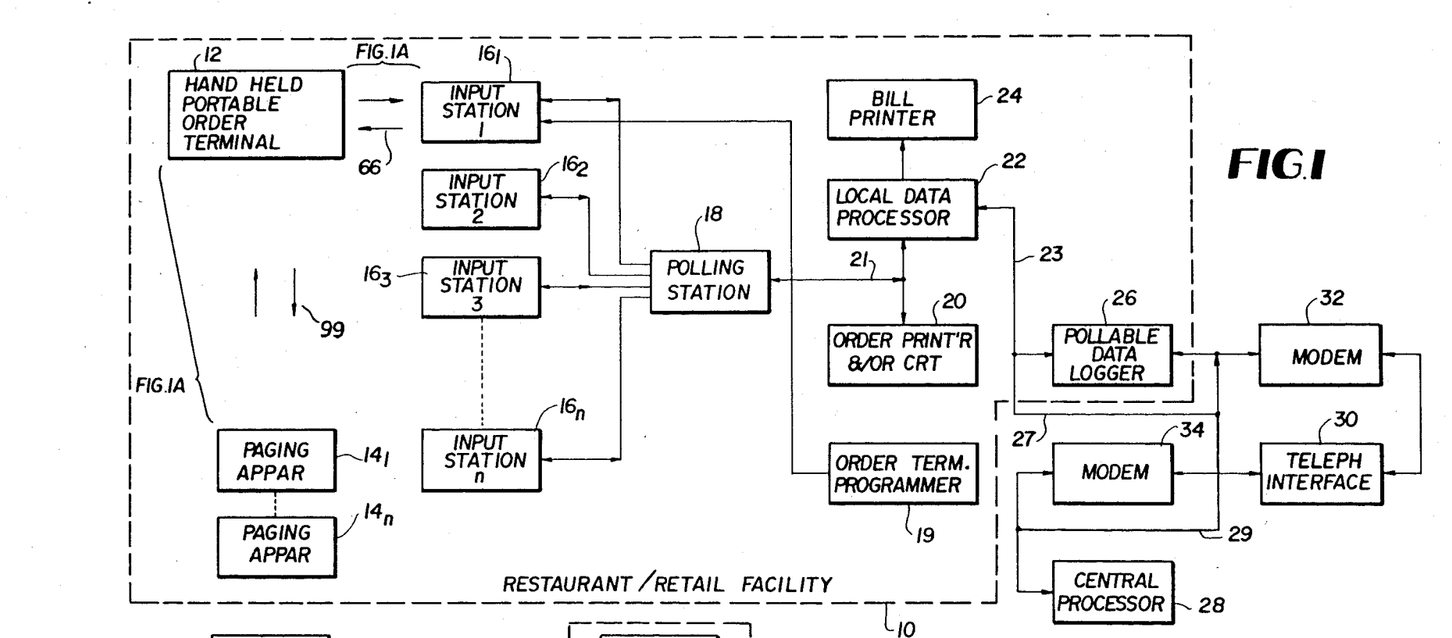
FIG. 1 is a block diagram broadly illustrative of the preferred embodiment of the subject invention.

Referring now to the drawings and more particularly to FIG. 1, reference numeral 10 denotes generally a commercial establishment such as a restaurant or other retail facility wherein customer orders are taken, filled and billed. For the sake of illustration and because it relates to a preferred utilization, the following detailed description will be considered in terms of, but not limited to, a restaurant facility. FIG. 1 is intended to provide an overview of such a system in which a hand held portable order entry terminal 12 shown in FIG. 3, held by a waiter, for example, is paged by any one of several paging transceiver apparatus $14_1 \ldots 14_n$ located at respective customer stations where customer service is desired and an order entry is thereafter made.

Typically, such an order entry involves entering the table number and number of parties at the specific customer station. An item on the menu is identified by a code which is entered into the hand held terminal 12 whereupon an alphanumeric description of the item, together with the price, is printed out on a tape. The operator or waiter continues to enter the order items where they are loaded into and temporarily stored in a memory until the order transaction has been completed, whereupon the hand held terminal 12 is taken to any one of a plurality of pollable input-output stations $16_1$, $16_2 \ldots 16_n$ coupled to a polling station 18 which sequentially interrogates each of the input-output stations looking for a terminal 12 coupled thereto.

Access to an input-output station is made by a "hand shake" procedure utilized in conventional data processing systems wherein a plurality of satellite data processors are coupled to a central processing system. With polling station 18 in communication with the portable terminal 12, the data stored therein is fed to an order printer and/or a CRT apparatus 20 located in the kitch via a bi-directional data bus 21 wherein the order taker notes the menu items desired and proceeds to fill the order. At the same time, the order information on data bus 21 is fed to a local data processor 22 which maintains a record of the particulars of the order fed into the terminal 12 until the transaction has been completed and the party or parties desires to check out, at which times a bill printer 24 connected to the computer 22, maintaining a running balance of the separate parties accounts at a particular table or station for additions, corrections and/or updates, inventory, etc., prepares a bill or bills, depending upon the initial billing separation desires of the parties concerned.

A pollable data logger 26, which may consist of a separate piece of apparatus or may be included as part of the local computer 22 is also coupled to a bi-directional data bus 23 and has for its purpose the coupling of the data outputted from the processor 22 to a central data processor 28 through a bi-directional communications link which may consist of, for example, telephone apparatus 30 coupled to a pair of modems 32 and 34 connected to either side thereof. When desirable, a direct on line, real time link may be utilized between local processor 22 and central processor 28. The central data processor 28 maintains a hierarchial position in the system and is adapted to be coupled to other similar facilities 10, not shown, for providing, among other things, a means of centralized record keeping and overall control of business operations. As a result, data logger 26 is eliminated and a direct on line, real time link is established between local processor 22 and central processor 28 by a bi-directional data bus 27.

Figures 1A, 3:
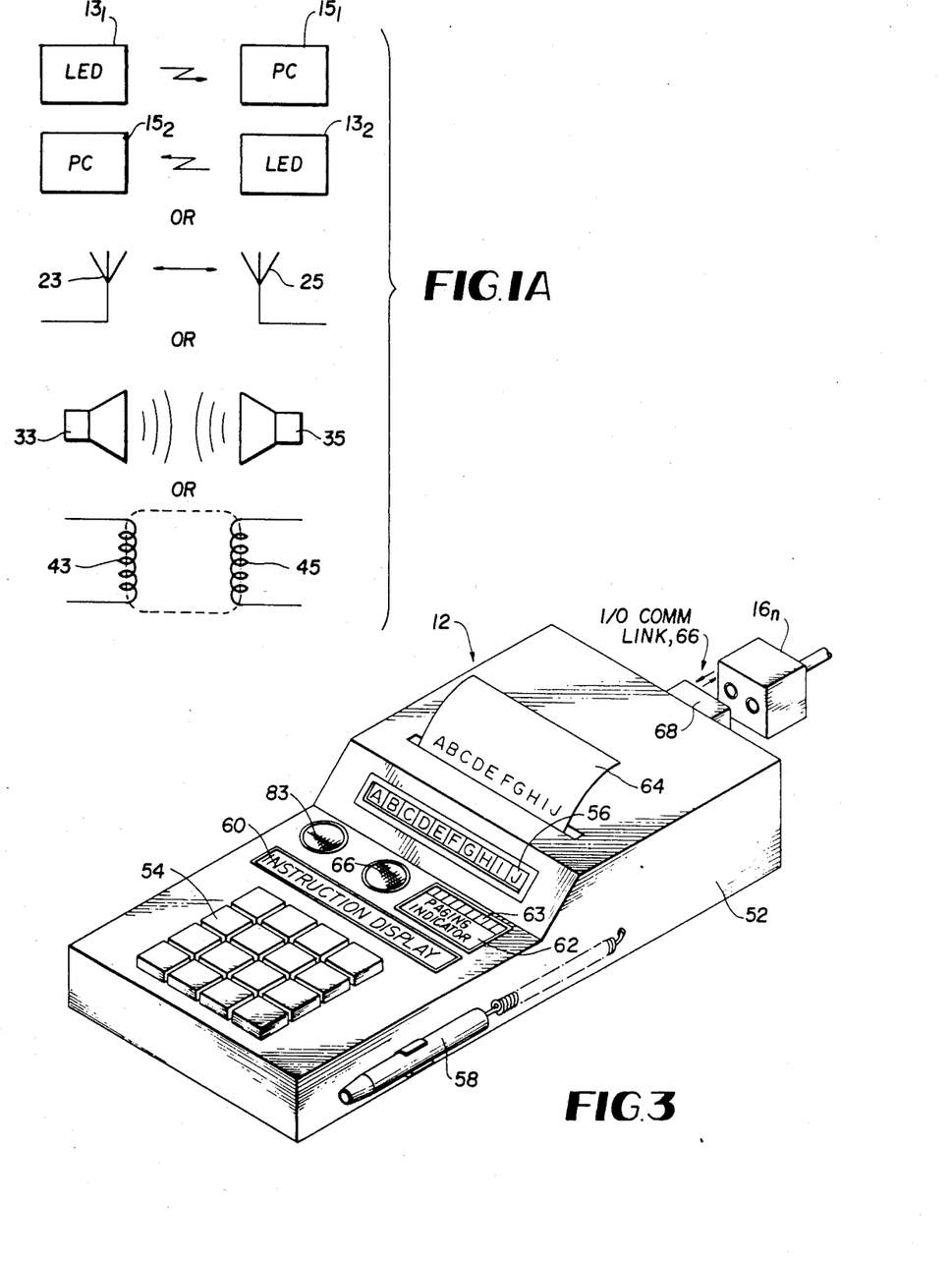
FIG. 1A is a schematic diagram illustrative of different types of energy coupling means utilizable by the subject invention.
FIG. 3 is a perspective view of a hand held portable order entry terminal in accordance with the subject invention.

Coupling between the hand held portable terminal 12 and the paging apparatus $14_1 \ldots 14_n$ as well as the input stations $16_1 \ldots 16_n$ is provided by a selected type energy means including but not limited to apparatus which as noted above employs optical, RF, audio, and inductive energy. Schematically this is illustrated in FIG. 1A where, for example, reference numerals $13_1$ and $13_2$ designate light emitting diodes while reference numerals $15_1$ and $15_2$ designate photocells in a bi-directional optical communications link. For a bi-directional radio or RF communications link a pair of antennas 23 and 25 are shown. For an audio link microphone/speaker apparatus 33 and 35 are required. If an inductive type of link is desired, magnetically coupled inductive devices 43 and 45 would be utilized. The circuitry associated with these energy type means are well known and within the scope of skilled circuit designers.

Figure 2:
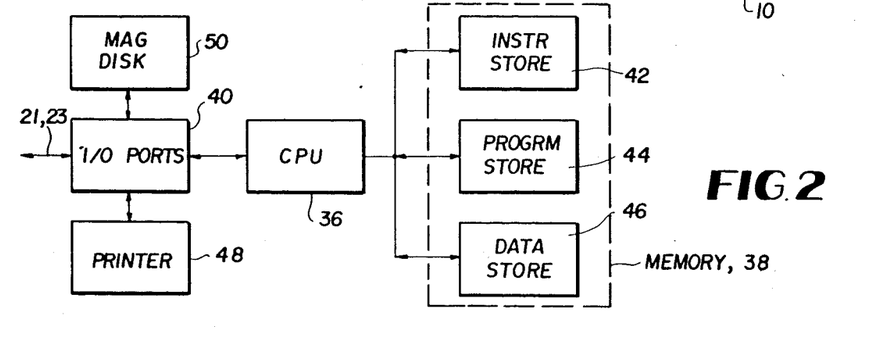
FIG. 2 is a block diagram broadly illustrative of a data processor.

Referring now to FIG. 2, the data processors 22 and 28 of FIG. 1 are digital computers. As is well known, a typical digital computer consists of generally three major parts, the central processor unit (CPU) 36, a memory 38, and a plurality of peripherals such as magnetic disk 50 and printer 48 which are attached to CPU 36 through I/O ports 40. The memory 38 serves as a place to store information and typically consists of three storage elements, namely an instructional storage 42, a program storage 44 and a data storage 46. The instructions contained in the storage 42 comprise coded bits of information that direct the activities of the central processor unit (CPU). These same instructions direct the activities of the data which are coded bits of information that are processed by the CPU. The program contained in the storage 44 comprises a group of logically related instructions that direct the activity of the CPU to produce predetermined useful results from the data stored. The input/output ports 40 comprise means by which CPU 36 communicates with the outside world, notably as illustrated, to peripheral line printer 48 and/or to peripheral storage device disk unit 50. Where, for example the computer apparatus shown in FIG. 2 is embodied in the local data processor 22 shown in FIG. 1, the input/output ports 40 would also couple to the data bus 21 and 23 as shown in FIG. 1 as well as the printer 24.

Having thus considered the invention in its general terms, certain specific details will now be considered. Referring to FIG. 3, there is disclosed an illustrative embodiment of the hand-held portable terminal 12 referred to above and shown in FIG. 1. This piece of apparatus includes a casing 52 resembling a conventional hand held electronic calculator and houses the circuitry shown in block diagram form in FIG. 4. This circuitry is adapted not only to provide visual instructions to the operator, i.e. waiter, for making a proper entry of the order data, but also to convert a stored product code of the entry into a visual alpha-numeric display and provide a hard copy print out of same. Accordingly, the casing 52 includes an alpha-numeric keyboard 54 for manually entering information into the device which is thereafter displayed on the electronic display 56. Ancillary to the keyboard 54 is a hand held scanning device 58, commonly referred to as a wand, which is utilized to optically enter information into the device in a manner to be described. In addition to the alphanumeric display 56, an operational instruction display 60 is provided adjacent to the keyboard 54 as well as input-output paging transceiver apparatus which is adapted to signal to the operator that a particular station(s) or table(s) in the restaurant facility requires service and is also adapted to output a signal to a like transceiver located in a companion terminal or at a central location. In addition to the visual indicating devices included on the casing 52, a hard copy print out 64 is provided giving a permanent record of items selected as well as any other associated information such as number of people in a particular party, table or station number, date and time of day and item cost and sub-totals and totals, etc. of the transaction. Also provided is an audio device 66 which is adapted to provide an audible indication of an incorrect operational sequence being performed by the operator. Once the operator has successfully entered customer orders and a billing arrangement therefor, meaning the number of individuals to be included in each billing operation, this information is coupled to an input/output communications link 66 employing either optical, RF, audio or inductive energy through a sub-assembly 68 located on the back of the casing 52 having the appropriate energy source and receptors, not shown, which are adapted to receive and transmit energy to like energy source and receptors located in one of the input stations $16_n$ (FIG. 1). A second audio device 83 is also provided to indicate a valid transmission of data as will be explained.

Figures 4, 5:
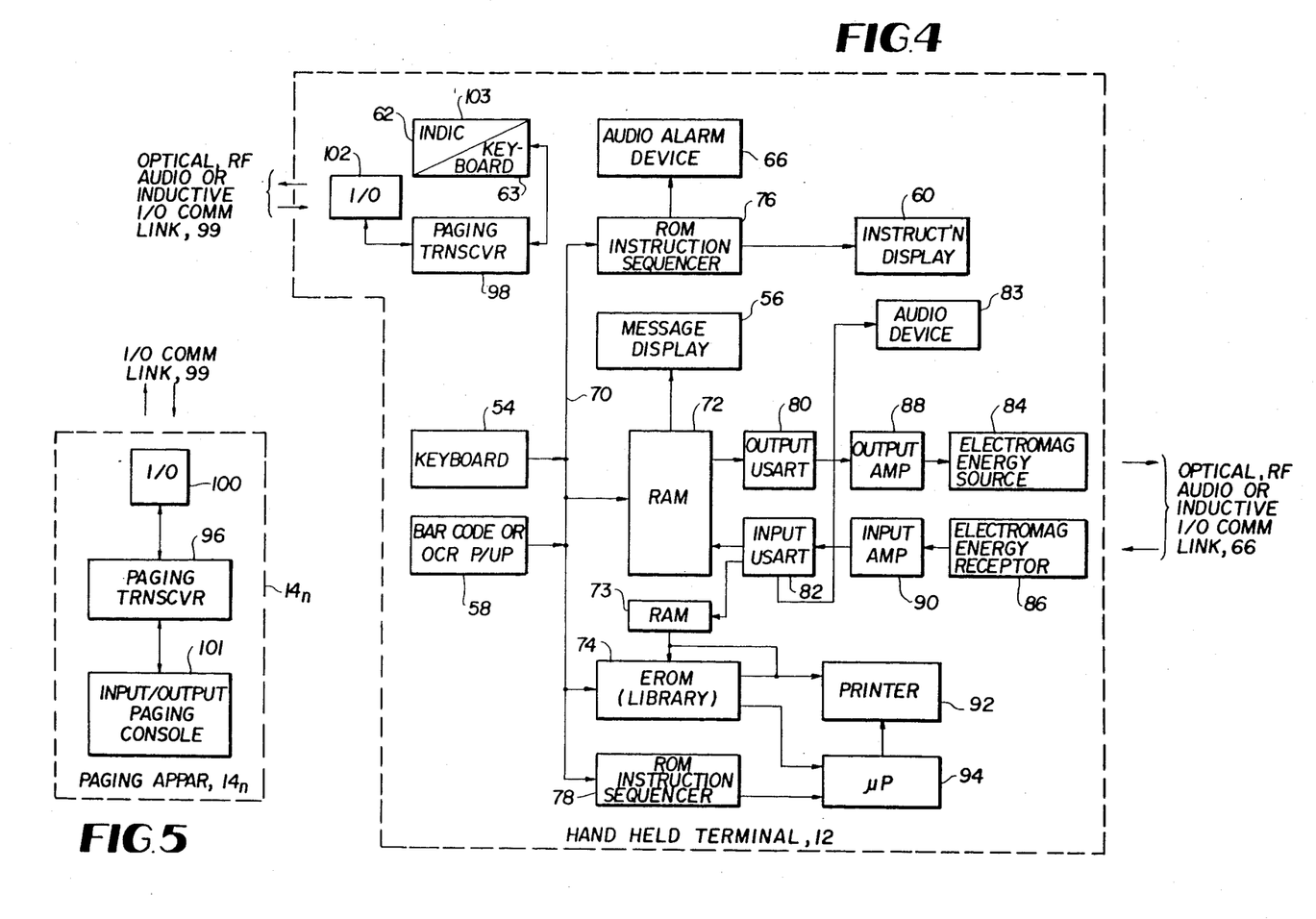
FIG. 4 is an electrical block diagram illustrative of the portable terminal shown in FIG. 3.
FIG. 5 is a block diagram generally illustrative of bi-directional paging apparatus utilized in connection with the order entry terminal.

Referring to FIG. 4, the interior of casing 52 includes among other things, a multi-line parallel digital data bus 70 adapted to couple the keyboard 54 and the optical pick up device 58 with a random access memory (RAM) section 72 and erasable read only memory (EROM) section 74 as well as two read only memory (ROM) sections 76 and 78. The RAM section 72 is adapted to temporarily store the data inputted either from the keyboard 54 or the optical pick up device 58 and then transfer it to the local data processor 22 and/or the central processor 28 over the bi-directional communications link 66. Inasmuch as transmission of data over the communications link 66 is transmitted in serial fashion and whereas a digital memory such as RAM 72 is adapted to handle data in parallel fashion, parallel to serial and serial to parallel conversion of digital data is provided by a pair of data converters 80 and 82 in the form of a "Universal Synchronous or Asynchronous Receiver and Transmitter" (USART), a typical example of which comprises a Fairchild F3843 USART. The USARTs 80 and 82 respectively couple to an electromagnetic energy source 84 and an electromagnetic energy receptor 86 through an output amplifier 88 and an input amplifier 90. As noted, the energy medium of the communications link 66 can be either optical, audio, inductive or RF in nature. Accordingly, the source 84 and receptor 86 are adapted to operate in the required mode. Where, for example the desired means for implementing the communications link 66 operates in the optical range of the electromagnetic spectrum, the source 84 would consist of, for example, a light emitting diode while the receptor 86 would consist of a photodetector diode. The RAM section 72, as noted, is adapted to temporarily store the transactional data entered. The display device 56 is coupled to the RAM section 72 for providing an indication of the data being entered. An item selected from a menu, for example, by the waiter operating the keyboard 54 also calls out a "cell" or section memory means, not shown, contained in the EROM section 74 for printing the alpha-numeric representation of the particular entry item and its cost along with other pertinent information. The EROM section 74 is coupled to a hard copy printer unit 92 and a microprocessor 94 to provide a copy of all items ordered, along with their cost as well as providing a billing thereof in accordance with a sequence of programmed instructions contained in a pre-programmed memory in the form of ROM 78. Additionally as data entry takes place the ROM 76 provides the necessary sequence of instructions on the display 60 to provide a fail proof method of entering the data into the hand held terminal 12 as shown in FIG. 1.

Thus, the terminal operator, upon being paged by paging apparatus disclosed in FIG. 5, takes the hand held terminal 12 to the calling station whereupon he enters the order. At the end of the order entry, the data is transferred from the RAM section 72 to the local data processor 22 where a running account of the transaction is recorded, for example, on a magnetic disk such as shown in FIG. 2 by reference numeral 50. At the same time, the order is printed and/or displayed on a printer or CRT 20 for purposes of the order taker. In addition, the data is sent along to the central processor 28 at the desired time. When the party or parties check out, the data recorded on the magnetic disk 50 is retrieved and a cashier, for example, located near the exit enters the table or station number in the local processor 22 through an auxiliary keyboard, not shown, whereupon the bill printer 24 provides a correct bill for each of the parties that have been served at that particular table or station. The circuitry by which the hand held terminal 12 communicates with the local data processor 22 and the central processor 28 as noted, involves the use of at least one input station $16_1$ which is adapted to complete the input/output communications link 66 with the polling station 18.

As to the bi-directional paging feature of the subject invention, each customer station $16_1 \ldots 16_n$ as shown in FIG. 5 includes transmitter/receiver (transceiver) apparatus 96 which is adapted to communicate with a like transceiver 98 located in the casing 52 of the hand held terminal 12 by means of a bi-directional input/output communications link 99 employing either optical, RF, audio, or inductive energy (FIG. 1A) coupled between respective energy transmission/receiving elements 100 and 102. In its present form, RF energy is considered to be the preferred energy type. The transceiver apparatus is also adapted to communicate with other like transceiver apparatus located at another order station, or a random or a central location, not shown. In order to properly operate the transceivers 96 and 98, each device also couples to a console type of device 101 and 103 with the device 103 at the terminal including at least a small paging indicator 62 and keyboard 63 located on the front face of the terminal 12. Like means are also included in the console 101. Also audio devices can be included when desirable to provide audible speech type communication between the paging station and hand held terminal.

Figure 6:
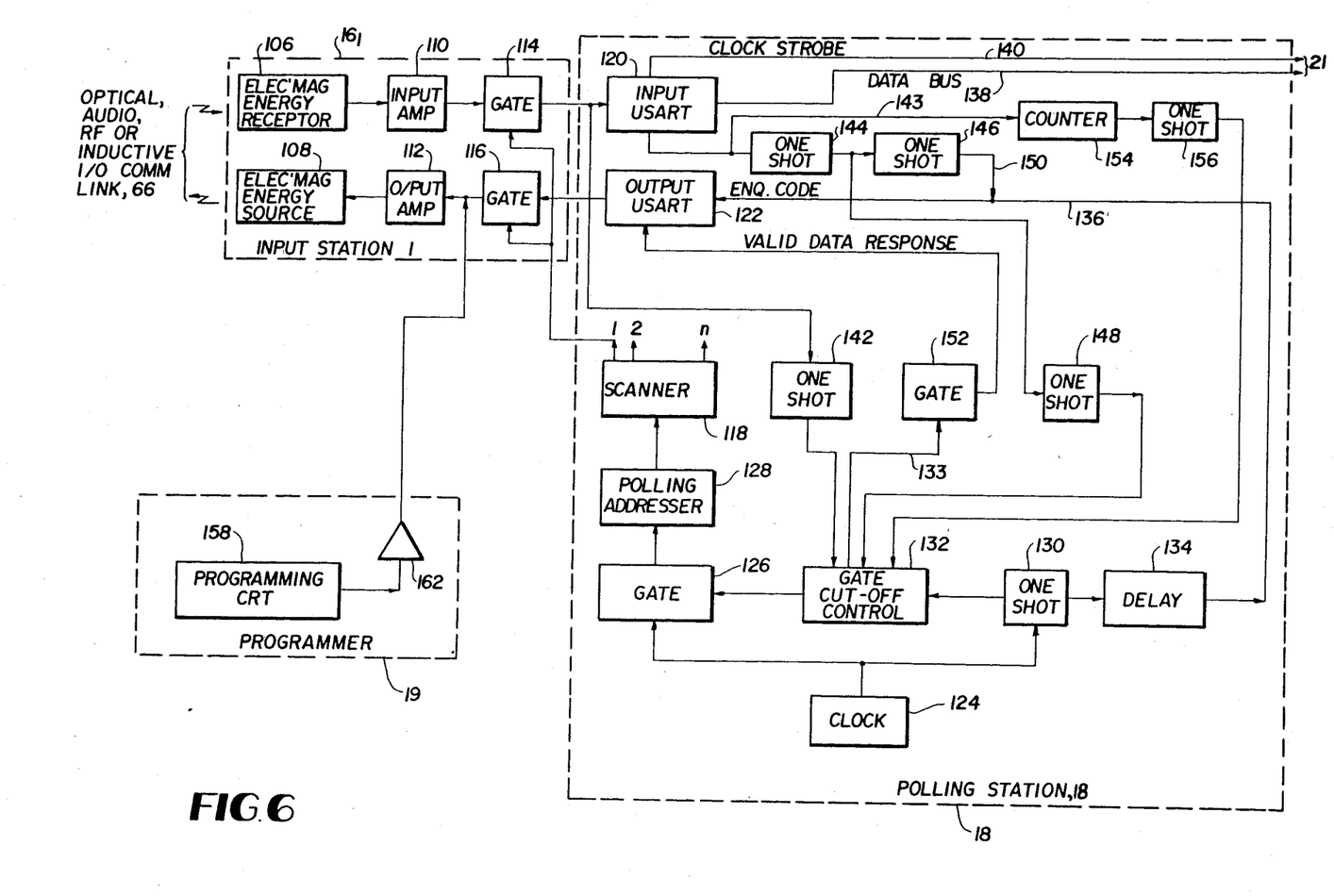
FIG. 6 is an electrical block diagram illustrative of one data input station, a polling station and terminal programmer for the embodiment shown in FIG. 1.

Referring now to FIG. 6, reference numeral 106 comprises an electromagnetic energy receptor associated with input station $16_1$ which is adapted to communicate with the source 84 shown in FIG. 4 while a source 108 is adapted to communicate with receptor 86. Where, for example, the optical link is desired, the receptor 108 would consist of a light emitting diode. Since bi-directionality is required of the communications link 66, energy received from the terminal 12 at the receptor 106 is amplified by amplifier 110 while the data to be transmitted thereto via the energy source 108 is first amplified by amplifier 112. The amplifiers 110 and 112 couple to the polling station 18 by means of signal gates 114 and 116. The polling station 18 samples each input station $16_1 \ldots 16_n$ in a sequential order by means of polling station selector or scanner 118, looking for a response from a hand held terminal 12. The polling station will pause for a specified time period any each input station and transmit thereto a "hand shake" signal. If no response is returned, the scanner 118 will move on to the next input station and again look for a response by sending out another "hand shaking" signal. If a correct response is received, scanning ceases and a lock-on mode is established wherein gates 114 and 116 are held enabled to input and output data formatters (i.e. USARTs) 120 and 122. The aforementioned operations are accomplished in the following manner. A free running clock 124 outputs pulses through a controlled gate 126 to a polling addressor 128 which comprises a counter coupled to the scanner 118 whose output is adapted to turn on gates 114 and 116 coupled to the input-output amplifiers 110 and 112 respectively. Along with the gate selection, the clock 124 triggers a one shot circuit 130 which is adapted to enable a gate cut-off control circuit 132 for a predetermined time period. The one shot circuit 130 also triggers a delay circuit 134 which outputs a pulse on line 136 which instructs the output USART 122 to issue a "hand shake" signal or "ENQ" code to the gate 116 which is thereafter coupled to the electromagnetic energy source 108.

Assuming that the portable terminal 12 is in communication with the input station 16₁, a "hand shake" signal is returned and a data stream is inputted from said terminal 12 through enabled gate 114 to the input USART 120 which is adapted to output data to the bus 21 shown in FIG. 1 which in FIG. 6 is interpreted to be data bus 138 and clock strobe line 140. The appearance of the incoming data stream out of gate 114 continuously retriggers one-shot circuit 142 for the duration of the data stream, thereby engaging control circuit 132 which further disables the clock gate 126 permitting scanner 118 to pause at the active polling station long enough to access the incoming data stream. If the data inputted to the USART 120 is in error, the input USART 120 will output a signal on line 143 which activates one-shot circuits 144 and 146. The output of one-shot circuit 144 triggers one-shot 148 which engages gate control circuit 132 to further disable the gate 126. The one-shot circuit 146 meanwhile outputs a signal on line 150, thus initiating another "hand shake" or ENQ code seeking another validation. If the data inputted to the input USART 120 is valid, the one-shot circuit 148 will not be triggered, whereupon the gate circuit 152 will be triggered by the restoration of gate cut off control circuit 132, through line 133 at the termination of the successful data stream, thus coupling a valid data response signal to the output USART 122. Thereafter, the gate control circuit 132 again enables the gate 126, whereupon the clock 124 will cause the polling address counter 128 to advance the scanner 118 to the next station. Also shown in FIG. 6 is a counter circuit 154 and a one-shot circuit 156 coupled to USART 120 error output line 143 and the gate cut off circuit 132. The purpose of these circuit elements is to detect and register an invalid input data transmission. An invalid input transmission for three successive times activates the output of counter 154 and triggers one-shot 156 to gate off control circuit 132, thus allowing gate 126 to again direct clock 124 pulses to polling addressor 128 so the next input station can be engaged by scanner 118.

Figure 8:
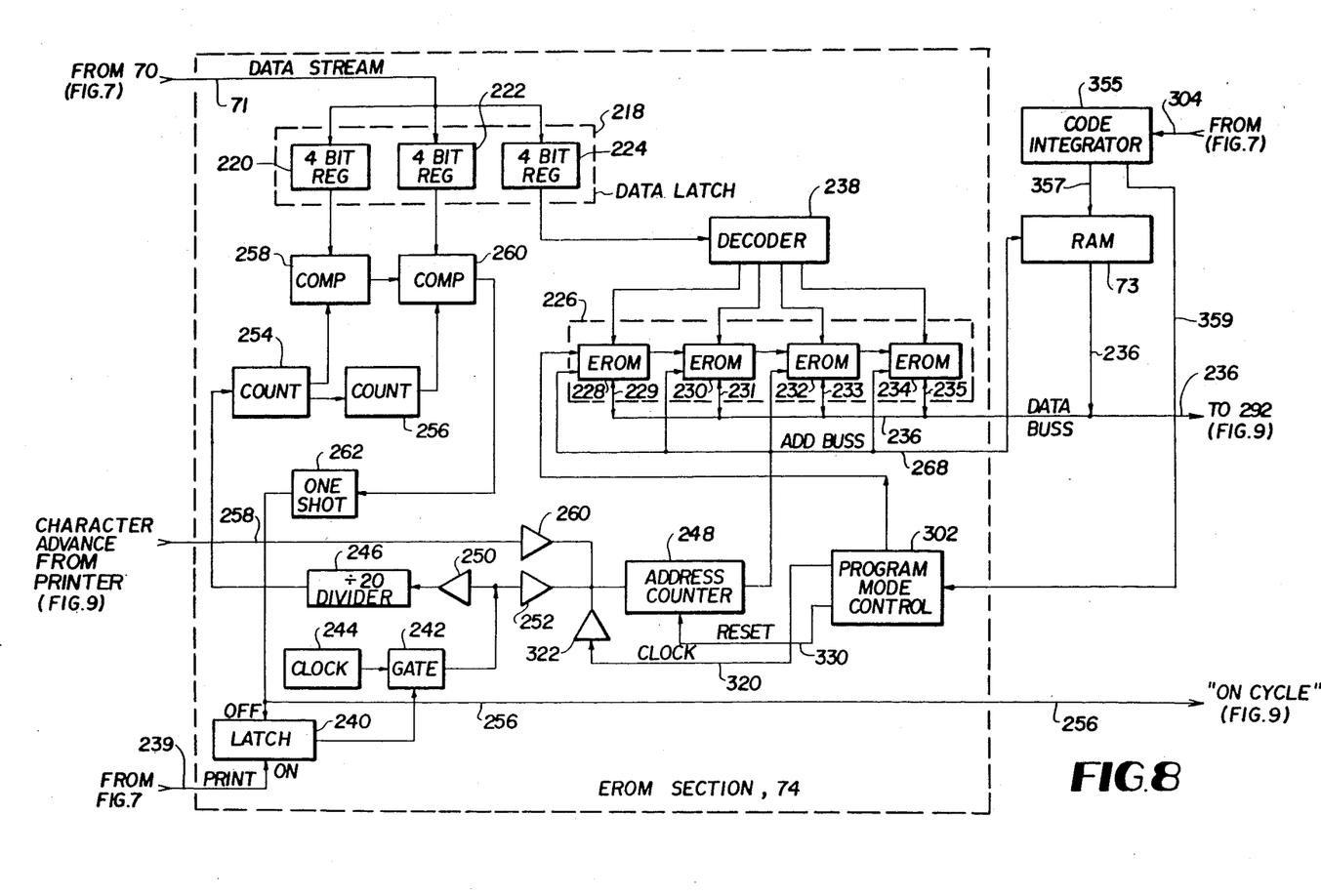
FIG. 8 is an electrical block diagram illustrative of the EROM section included in the circuitry for the portable terminal shown in FIG. 4.

FIG. 6 also discloses a source 19 of programming or re-programming the EROM section 74 shown in FIG. 4. The programmer 19 shown in FIG. 6 consists of a CRT device/58, a typical example being a Televideo Model TVI 920B, which when properly loaded feeds a serial data stream of program material to output amplifier 112 via buffer amplifier 162. The output amplifier 112 coupled to the electromagnetic energy source 108 couples the data to the energy receptor 86 shown in FIG. 4 where it is then reconverted to a parallel format in USART 82. The parallel data program material is then fed to the RAM 73 where it is then transferred to the EROM section 74. This will be discussed further when the details of FIG. 8 are considered.

Figure 7:
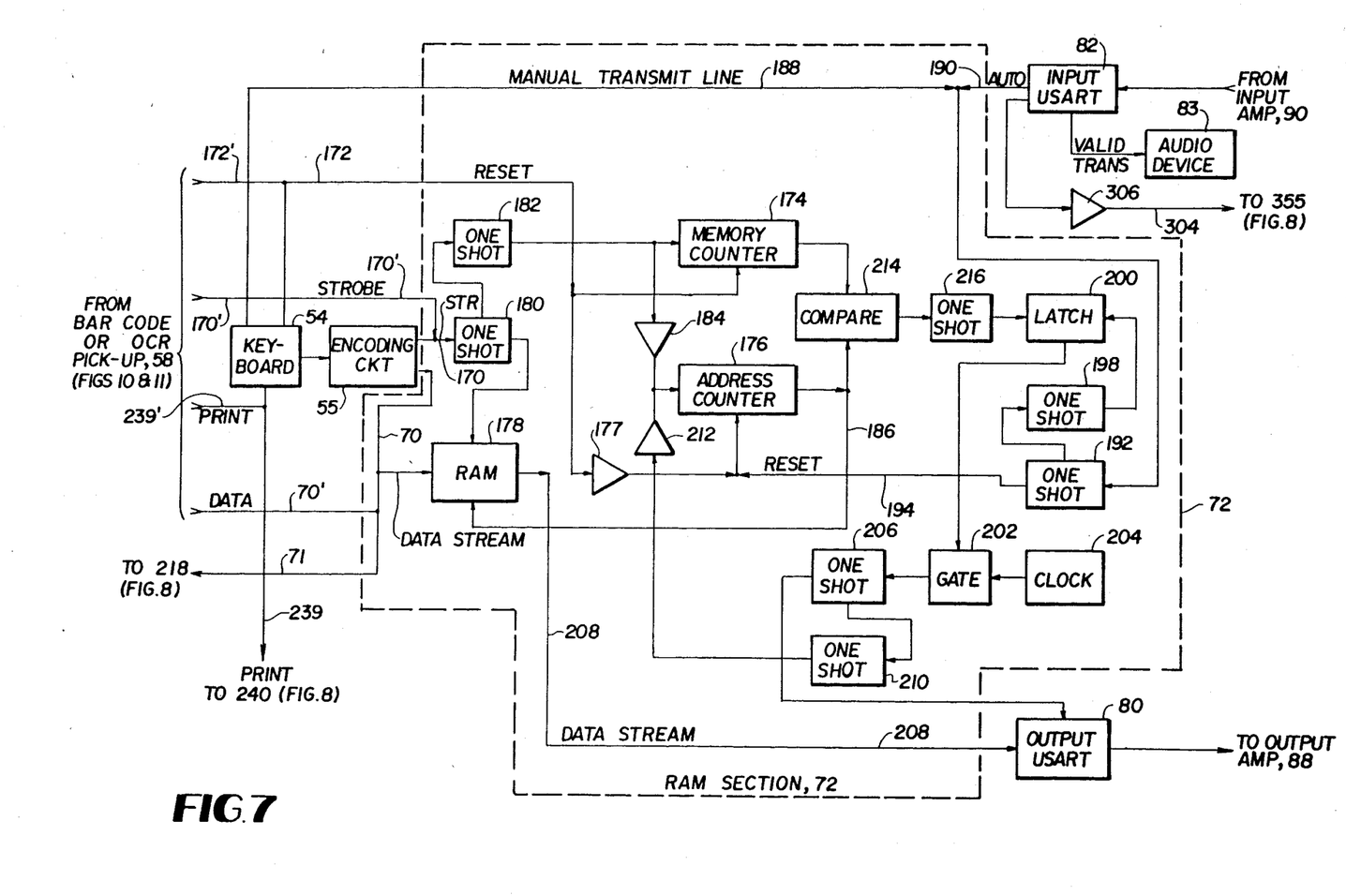
FIG. 7 is an electrical block diagram illustrative of the RAM section included in the circuitry for the portable terminal shown in FIG. 4.

Referring now to FIG. 7, in order to provide a digital representation of the various keys activated on the keyboard 54 by the operator of hand held portable terminal 12, an encoding circuit 55, not heretofore shown, is adapted to output corresponding multi-bit digital words in a parallel format on data bus 70 along with a strobing signal on the line 170. To begin operation, an operator presses a reset key, not shown, on the keyboard 54 which transmits a reset signal on line 172 to a memory counter 174 and to address counter 176 through buffer 177. Thereafter, the operator enters an item to be ordered by pressing a particular key on the keyboard 54. The data outputted from the encoding circuit 55 is entered into a random access memory (RAM) 178 with one-shot circuit 180 being triggered by a strobe signal from the encoding circuit 55. The one-shot circuit 180 outputs a signal for a predetermined time after being activated by encoding circuit 55, so as to strobe load RAM 178. After the predetermined loading period, the one-shot circuit 180 restores and in so doing triggers one-shot circuit 182 which advances the memory counter 174 and address counter 176 one increment. Buffering between the counters is provided by means of buffer amplifier 184. The output of address counter 176 indexes the address location of the RAM 178 through address bus 186. After all of the data has been entered into the RAM 178 from the keyboard 54, the operator activates either a manual transmit signal on line 188 or places the portable terminal 12 into a polling input station 16ₙ whereupon an automatic transmit signal is supplied therefrom through USART 82 on line 190. Both lines 188 and 190 couple to a one-shot circuit 192 which resets the address counter 176 through line 194 while not affecting the memory counter 174 due to the presence of the buffer amplifier 177. Upon restoration of the one-shot circuit 192, one-shot circuit 198 is triggered thusly to turn on latch 200. The latch 200 enables gate 202 which couples a free running clock 204 to activate the one-shot circuit 206 which in turn operates to strobe data from RAM 178 over the data bus 208 through the output USART 80 which is coupled to the output amplifier 88 (FIG. 4). After every output data strobe by one-shot circuit 206 to USART 80, one-shot circuit 206 restores and triggers one-shot circuit 210 which is coupled to address counter 176 through the buffer amplifier 212 and advances the address counter 176 one memory position each time a new character is strobed through output USART 80 from RAM 178 by one-shot 206. When the address counter 176 advances far enough to match the count in memory counter 174 which was incremented to its count position when the RAM 178 was initially loaded, a comparator 214 coupled to both counters senses the match and triggers one-shot circuit 216 which resets latch 200, causing gate 202 to become disabled until a new entry cycle is either initiated manually or automatically. Thus each character or data word initiated from the keyboard 54 is first fed in parallel format to the RAM 178 where it is first stored and on command, shifted out to the USART 80 in parallel and converted by said USART 80 into a serial data stream for presentation to the electromagnetic energy source 84 (FIG. 4) for coupling to the communications link 66.

As noted above, the hand held terminal 12 is adapted to provide a printed representation of the entries made through the keyboard 54 or the optical pick up device 58 and in so doing requires local storage to provide a library of menu items in digital form which can be converted from a digital data stream appearing on the data bus 70 into an alpha-numeric representation and thus hard copy. This as noted is provided by means of the EROM section 74 (FIG. 4). The details of this section are shown in FIG. 8. Referring now to FIG. 8, shown therein is a data latch 218 consisting of three four bit registers 220, 222 and 224 which are coupled to the data bus 71 which is coupled to data bus 70 (FIG. 7). The data stored in these registers represent an address, for each encoded entry from the keyboard 54, or optical pickup device 58 to an erasable read only memory 226 consisting of four EROMs 228, 230, 232 and 234, each consisting of 2048 bytes of memory, thus providing up to 102 full 20 character blocks in each EROM memory for a total of 408 twenty character blocks. The four EROMs are coupled to a common bi-directional data bus 236 and are enabled individually through a binary to decimal decoder 238 and commonly addressed by counter 248. Accordingly, any item selected on the keyboard 54 will have its alpha-numeric representation outputted on data bus 236 to a printer mechanism shown in FIG. 9 in response to a "print command" signal initiated from the keyboard 54 on line 239. The same command can originate from the optical input device 58. The print command is adapted to turn on a latch 240 which is configured to enable a gate 242 connected to a free running clock 244. Pulses from the clock 244 are fed to a divide by 20 counter 246 as well as EROM address counter 248 through buffer amplifiers 250 and 252 respectively. For every 20 clock pulses from clock 244, the cascaded counters 254 and 256 advance one count, thereby defining a 20 character block. When the count in the counters 254 and 256 match the binary input stored in registers 220 and 222, comparators 258 and 260 sense the match and output a signal to one-shot 262 which turns off latch 240.

Figures 9, 9A:
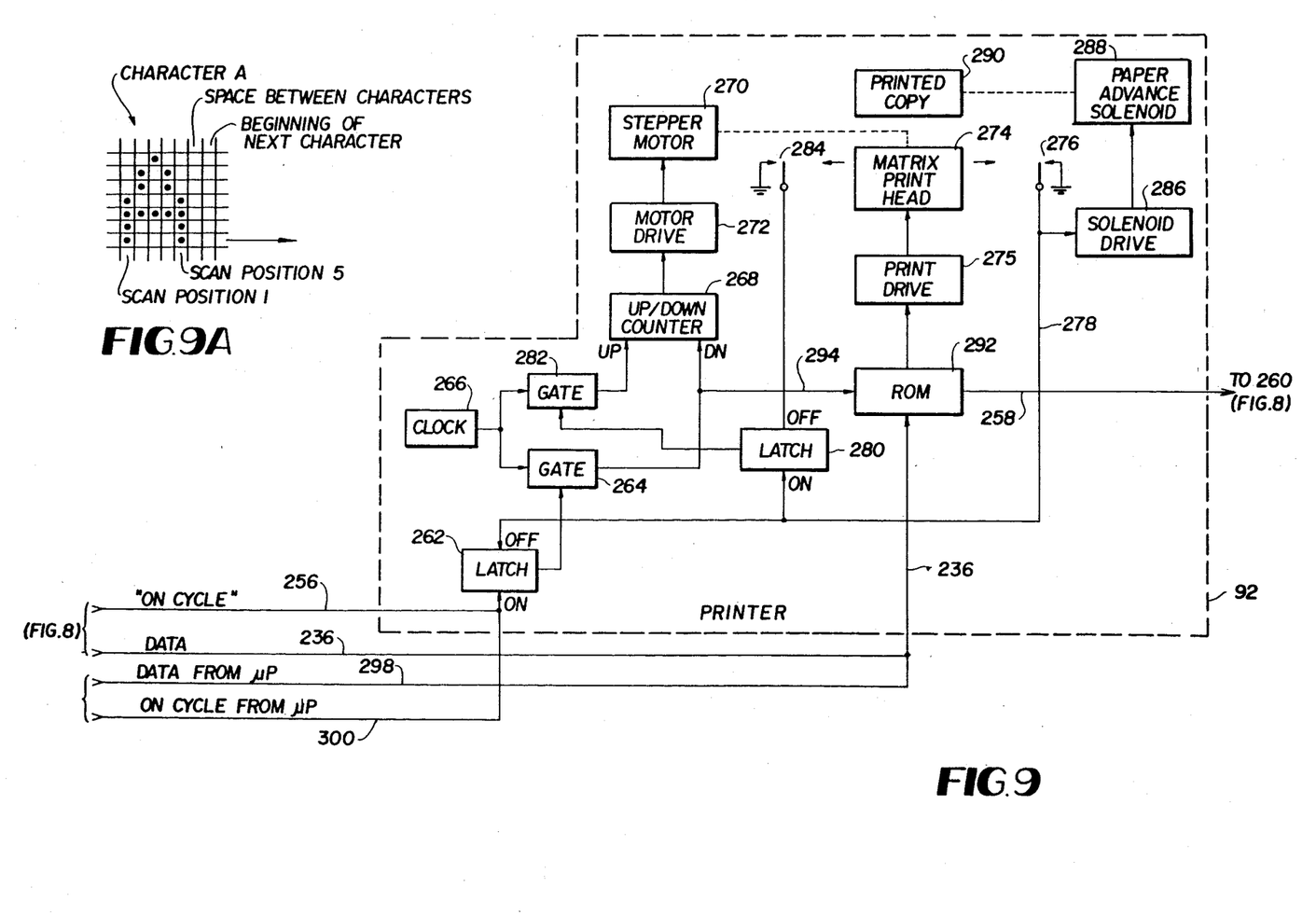
FIG. 9 is an electrical block diagram illustrative of the printer apparatus in the circuitry for the portable terminal shown in FIG. 4.
FIG. 9A is a diagram helpful in understanding the operation of the apparatus shown in FIG. 9.

Since the registers 220 and 222 together can store up to a count of 99 and register 224 can select one of four EROMs, a total of three hundred ninety six 20 character data blocks representing a 20 character print-out can be stored and read out selectively on the data bus 236 to the printer whose circuitry is illustrated in FIG. 9. It should be pointed out that the four EROMs 228, 230, 232 and 234 can be conventionally programmed via the RAM 73 (FIG. 4) over data bus 254 which is coupled to data bus 236 since each of the EROMs 228, 230, 232 and 234 include bi-directional input/output data buses 229, 231, 233 and 235 which are connected to the common data bus 236.

At the time the clock 244 output is gated and advancing the counters 254 and 256, the clock is also advancing the address counters 248 through the buffer amplifier 252. When the one-shot circuit 262 turns off latch 240, it also outputs a signal on bus 256 in turn on the printer (FIG. 9). Every time a character is printed, the address counter 248 is advanced one increment by a signal from the printer circuitry on line 258 which is coupled to address counter 248 through buffer amplifier 260, whereupon the entry from the keyboard 54 or OCR wand 58 stored in data latch 218 will address EROM memory 226 whose selected memory section will output on data bus 236 which feeds a print head shown in FIG. 9.

The printer circuitry shown in FIG. 9 consists primarily of a print mechanism and control circuitry. As shown in FIG. 8, an "on cycle" signal applied to circuit line 256 from EROM section 74, turns on latch 262 which enables gate 264 coupled to free running clock 266 which applies pulses to the "down" or forward input of an up/down counter 268. The up/down counter 268 is adapted to operate a stepper motor 270 through motor drive 272. The stepper motor is mechanically coupled to a conventional matrix print head 274 which is driven by print drive circuit 275. In the "count down" or forward mode the matrix print head 274 advances from left to right until a limit switch 276 is activated. When the matrix print head 274 reaches the limit switch 276, it closes, causing a signal to be coupled to latch 262 through line 278 which turns off and in turn disables gate 264. At the same time, the signal turns on a latch 280 which enables a gate circuit 282 coupled to clock 266 which thereafter couples clock signals to the "up" or reverse input of the up/down counter 268 which reverses the stepper motor 270, causing the matrix print head to travel from right to left toward the limit switch 284 which upon being closed turns the latch 280 off, whereupon pulses from clock circuit 266 are removed from the input of the up/down counter 268. The print mechanism thus remains in the quiet state until another print command is issued from EROM memory 226 shown in FIG. 8. It can thus be seen that limit switches 276 and 284 act as margin stops for the print head 274. It should also be pointed out that the closure of the right hand limit switch 276 also activates a solenoid drive circuit 286 which is adapted to activate a paper feed solenoid 288 for advancing a record medium 290 which is adapted to provide a printed copy of the output of the print head 274. At the same time up/down counter 268 is advancing the print head 274 from left to right across the medium 290, the clock 266 is also advancing a counter in "character generator" ROM 292 such as the MOSTEK MK 2302P. This particular character generator ROM produces a printed character by outputting a possibility of seven print impressions in a vertical row five times, side by side as its associated print head 274 moves from left to right across the paper to form what is known as a 5×7 dot matrix image. Such an image is shown for the character "A" in FIG. 9A. The output of this character generator usually drives either seven vertically spaced solenoids with print wires that impact a ribbon onto the paper to produce an image or a thermal print head comprised of seven vertical heat elements which heat sensitized paper and create the same image as the solenoid impact mechanism does. In the present invention, matrix print head 274 is preferably of the thermal type. For each character printed, the output of EROM storage 226 is held static for five pulses from clock 266, FIG. 9, until the print head 274 has scanned five vertical dot positions on the paper and produced the 5×7 dot image character, and an additional clock pulse to produce a spacing between characters, for a total of six clock pulses. At this point the counter in character generator ROM 292 outputs an EROM memory advance pulse on line 258 which through buffer 260 (FIG. 8) is coupled to address counter 248 which in turn advances one increment and brings up on bus line 236 the next character to be interpreted by character generator ROM 292 (FIG. 9) and outputted to print head 274 for printing on copy 290. This process is repeated continuously until the print head 274 engages limit switch 276 and stops the process. It should be pointed out that this particular system is designed to print one line at a time between "print commands" and that each line is defined as a maximum of 20 characters in length as determined by EROM section 74 support circuitry, specifically divide by 20 circuit 246 in FIG. 8. However, other formats of various print configurations can be implemented through circuit modifications. Additionally, it should be noted that the character generator ROM 292 is only engaged while the matrix print head 274 is moving across the copy 290 from left to right. This is so the printer will not try to print during a "carriage return" cycle. Line 294 in FIG. 9 enables character generator ROM 292 only in the forward print direction. After the matrix print head 274 has returned to the left hand margin it will remain there in standby until another "print command" is initiated. Additionally, the ROM character generator 292 through data bus 298 and latch 262 through "on" cycles line 300 receives like information from microprocessor 94 shown in FIG. 4 for printing subject matter such as bill sub-totals and totals for the ordering parties at the site of origin. Microprocessor 94 can assume many roles in the general system configuration of terminal 12. These can include not only the functions of a simple calculator chip for sub-totaling and totaling bills and figuring taxes, but also can implement the expanded role of total supervisory manipulations of the entire terminal.

As noted, the portable hand held terminal 12 contains a library of information corresponding for example, to menu items in the EROM section 74. The manner in which EROM memory 226 in the EROM section 74 as shown in FIG. 8 is programmed is through data bus 236 being presented with the desired bit configuration at the specific address location(s) while the EROM memory 226 is in the program mode as determined by a program mode control circuit 302. The programming operation is as follows: programming data is down loaded from CRT programmer 158 in FIG. 6 out through electromagnetic energy source 108 and into terminal 12 through electromagnetic energy receptor 86, FIG. 4, through USART 82 out on data bus 304, through buffers 306 (FIG. 7), which inputs to a code integrator 355 shown in FIG. 8. For each valid transmission of data, the USART 82 will activate the audio device 83 which constitutes a beeper type of device. Data is outputted from the code integrator 355 on line 357 to RAM 73 where it is stored. The purpose of code integrator 355 is to allow RAM 73 to be loaded with desired coding information, but to prevent control codes intended for program mode control 302 from entering RAM 73. At this point a special program code is sent to program mode control circuit 302 on line 359 from code integrator 355. The program mode control circuit 302 then cycle loads EROM memory 226 from RAM 73 through common data bus 236 and common address bus 268 after first resetting common address counter 248 to its starting point by strobing reset line 330. Thereafter, address counter 248 is advanced during the program load cycle by clock output pulses from a clock, not shown, in the program mode control circuit 302 over clock line 320.

Because the EROM memory 226 is programmed from the input station side of the system, the programmer apparatus 19 shown in FIG. 6 can, when desired, be replaced by suitable circuitry, not shown, which couples back, for example, to the central processor 28 through modems 32 and 34 and the telephone interface 30 to be programmed remotely by a down loading operation, depending upon the requirements of the particular system. When desirable, the EROM memory 226 can be loaded through a hard wire connection by directly connecting a local programmer through a plug attachment, not shown, coupling to data bus 236, address bus 268 and input line 359 on mode control 302. Since RAM 73 (FIG. 8) can be loaded directly from input USART 82 (FIG. 7) and since data bus 236 also couples to print section, FIG. 9, a print out of data from an external source without calling on EROM library 74 can be had when desired because data bus 236 provides the necessary link.

Figure 10:
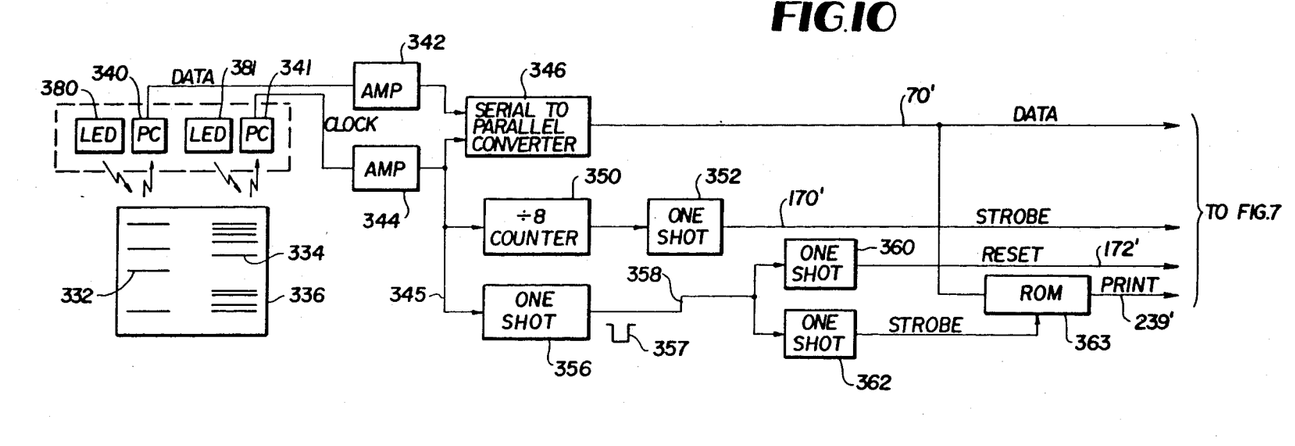
FIG. 10 is an electrical block diagram of the bar code input apparatus included in the circuitry shown in FIG. 4.
Figure 11:
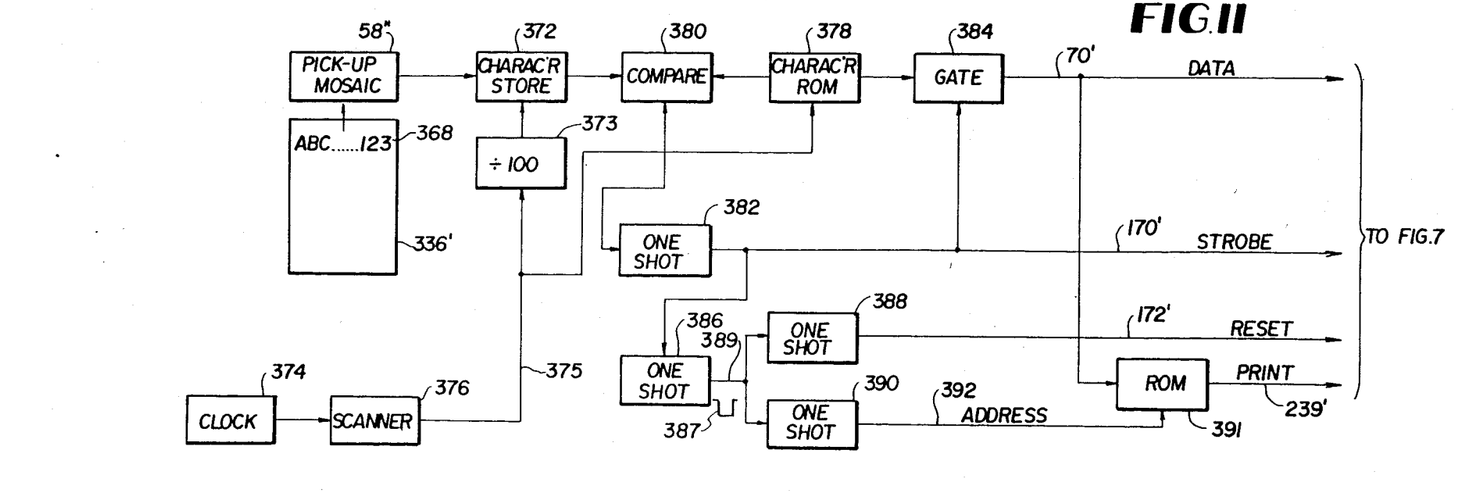
FIG. 11 is an electrical block diagram of the optical code reader (OCR) apparatus included in the circuitry shown in FIG. 4.

In order to now illustrate the manner in which the portable order terminal 12 can be utilized in connection with the optical pick up device 58 shown in FIG. 3, FIGS. 10 and 11 are included to illustrate two different versions of such apparatus. FIG. 10, for example, is intended to disclose the circuit means utilized with a wand type bar code type of pick up device 58′ and FIG. 11 is intended to be utilized with an optical character reader type of device 58″. Referring first to FIG. 10, reference numerals 332 and 334 represent data and clock bar code indicia, respectively, contained on a menu card or other source media, for example, 336. The pick up 58′ includes two pairs of light emitting diodes 380 and 381 and photo cells 340 and 341 which are adapted to illuminate and pick up, respectively, the bar code information, whereupon the data and clock information sensed thusly is applied to amplifiers 342 and 344 respectively where it is fed to a serial to parallel converter 346 such as a National Semiconductor, Inc. type 74164, whose output is applied in parallel fashion to data bus 70 in FIG. 7 via data bus 70′. As the pick up wand 58′ scans bar code copy 336 and reads data bars 332 and clock bars 334, data and clock pick ups respectively 380 and 340 for data and 381 and 341 for clock output to serial to parallel converter 346. As the data is presented to serial to parallel converter 346 through amplifier 342, the clock signal strobes that data into the converter 346 through amplifier 344. Meanwhile divide by 8 counter 350 accumulates the number of clock pulses strobed into converter 346. When eight clock pulses are accumulated, one eight bit data character will be present on the parallel output of serial to parallel converter 346. The eight count on counter 350 will then output to one-shot 352 which will strobe output line 170′ and enter this parallel presentation on data bus 70′ into RAM 178, FIG. 7, via data bus 70. This process is repeated continuously until all data is scanned by bar code pick up wand 58′ on copy 336. Incoming clock pulses outputted from amplifier 344 on line 345 activate continuously retriggerable one-shot 356 which creates data envelope 357 on line 358. One-shot 360 whose output resets counters 174 and 176 in FIG. 7 is activated on the leading edge of data envelope 358. The last character that the serial to parallel converter will output is the print character. If the pick up of the bar code indicia 332 and 334 by the wand 58′ has been successful, everything will be in sequence and the last character on data bus 70′ will be a print command which will be encoded by a ROM 363. One-shot 362 will activate on the trailing edge of the data envelope 357, which signifies the end of the serial clock stream and hence the end of the reading sequence. When one-shot 362 is activated, it enables ROM 363 which outputs a print command on line 239′ which couples to line 239 of FIG. 7, providing a valid print character is feeding ROM 363 over data line 70′. It should be noted that clocking bars 334 are much narrower than data bars 332 and occur at midpoint to data bars so as to ensure an accurate presence or non-presence of data for the clock bars to strobe.

With respect to the OCR embodiment shown in FIG. 11, the pick up wand 58″ is shown consisting of an optical mosaic which is adapted to sense alpha-numeric information 368 contained on copy 336′ which as noted before is a menu card or other source media. The pick up 58″ feeds the information sensed to a character storage memory 372. After a sequence of characters have been read, a scanner 376 driven by a clock 374 steps a ROM 378 which contains a library of characters to be read and interpreted past character storage memory 372. Assuming that the ROM library 378 contains 100 characters, each character in storge memory 372 must be interrogated 100 times by character ROM 378 looking for a match in comparator 380. For this reason a divide by 100 circuit 373 is inserted into clock line 375 so that ROM 378 cycles 100 characters for every 1 character cycled by character storage memory 372.

When a character in ROM 378 matches a character in character storage memory 372, a comparator circuit 380 outputs a strobe signal through one-shot circuit 382 which is adapted to also enable gate circuit 384 which outputs a code to data bus 70' which is representative of the character interpreted. The strobe signal is applied to bus 170' which loads data in RAM 178 in FIG. 7 via data bus 70. One-shot strobe 382 outputs to continuously retriggerable one-shot 386 which creates an output envelope 387 on line 389. One-shot 388 triggers on the leading edge of envelope 387 and outputs a reset to line 172 in FIG. 7 via line 172'.

A ROM 391 is sensitive to a print code on data line 70'. When one-shot 390 activates on the trailing edge of data envelope 387, it outputs an enable on line 392 to ROM 391 whose output activates print command on line 239' which couples back to line 239 of FIG. 7.

Considering again the overall sequence of operation where, for example, a restaurant facility is implemented, the operator, upon being paged, addresses the table to take the order and then enters the table or station number in the hand held terminal 12 and determines the number of paying parties at a particular table along with the number of customers in each party, whereupon the operator enters the first party number followed by the number of people in that party. The party number and number of people in the party will be printed out. Next, the operator enters the items ordered. For each item ordered, the product code indexed on the keyboard plus the alpha-numeric description of the product and the unit price for that product will be printed out on a single 20 character line. Optionally the total, including tax can be printed for party one through the action of microprocessor 94, as shown in FIG. 4. The above process is repeated for every separately billed party at that table or order station. While the product code, alpha-numeric item description and price are outputted in a 20 character line on the printer of portable hand held terminal 12, the party number, number of people in the party and optionally the date and time of day are entered into a temporary storage RAM 178 of terminal 12 along with item codes for the products ordered. After the order is loaded into the memory for a given table or order station and a printed record of the order is produced by the printer on the hand held terminal 12, the operator steps over to one of the several input stations 16$_1$ ... 16$_n$ and automatically transmits the contents of the RAM 178 through the bi-directional communications link 66 to a printer and/or a CRT terminal 20 wherein the order is displayed to a person assigned to fill the order. Also, the contents of the order is fed over the communications link 66 to a local computer 22 and when desirable, to a remote central hierarchial computer 28. The local computer which maintains, among other things, a running inventory, also keeps a current running record of the order for a particular table(s) until such time as the party checks out. Upon check out from a particular table, the cashier optionally can key in the table number through a keyboard at the bill printer station and any other number of individual party numbers from that table and produce individual bills or the cashier can through a single table number entry, produce all of the parties' bills for that particular table.

Having thus shown and described what is at present considered to be the preferred embodiment of the subject invention, all modifications and alterations coming within the spirit and scope of the invention as defined in the appended claims are herein meant to be included.

I claim:

1. In a vending system including a portable data terminal adapted to interact with a data processor for implementing an order transaction, the combination comprising:

a plurality of ordering stations, each having respective bidirectional paging transceiver apparatus of a selected energy type adapted to communicate with like paging transceiver apparatus located in at least one portable hand held ordering terminal;

at least one portable hand held ordering terminal including, like transceiver apparatus of said selected energy type adapted to provide an indication of a page to an operator carrying said ordering terminal and to provide operator communications with said ordering stations and any other location having like transceiver apparatus of said selected energy type, a first digital memory, means for entering digital data corresponding to an order transaction into said first memory for temporary storage, a second digital memory and being of a down loaded reprogrammable type having stored data therein corresponding to a programmed library of product codes of orderable items and being operable to output an alpha-numeric code sequence of an ordered item in response to an order entry by said operator, means providing a print out of each ordered item in alpha-numeric form and means coupled to said first memory for transferring said data in temporary storage to a selectively addressed wireless communications link under program control;

said communications link comprising a pollable bidirectional wireless communications link of a selected type including a controlled polling station, a plurality of pollable input stations coupled to said polling station, said polling station being operable to repetitively interrogate said plurality of input stations and lock onto an input station in communication with said hand held ordering terminal to accept data therefrom and couple said data to means providing a visual representation of an order entry and to a data processor;

means coupled to said communications link and being responsive to the data from said temporary storage provided by said first memory to provide a visual representation of the order entry in said terminal, said visual representation means being located at an order filling location separate from said ordering station;

a data processor coupled to said communications link and being responsive to data translated thereto from said first memory of said hand held ordering terminal to maintain a running account of the transaction and provide billing information therefrom; and means coupled to said data processor for providing a printed record including a bill at the end of the transaction.

2. The system as defined by claim 1 wherein said means for entering data comprises a keyboard.

3. The system as defined by claim 1 wherein said means for entering data comprises an optical code pick up device.

4. The system as defined by claim 1 wherein said communications link is of the type which uses energy selected from optical, radio frequency, audio and inductive energy.

5. The system as defined by claim 1 wherein said second memory comprises a reprogrammable nonvolatile memory which is locally and remotely programmable on demand by an external source to change said product codes, being remotely programmed from a remote external source through said bidirectional communications link.

6. The system as defined by claim 1 wherein said portable hand held ordering terminal additionally includes microprocessor means coupled to said means providing a human readable copy for providing a copy of a billing information in response to an order entry.

7. The system as defined by claim 6 wherein said microprocessor means additionally is adapted to effect a supervisory control of the order terminal.

8. The system as defined by claim 1 and additionally including means for down load programming and reprogramming said second digital memory over said communications link.

9. The system as defined by claim 8 wherein said means for download reprogramming is coupled to said second digital memory by means of said wireless communications link to change predetermined data stored therein on demand.

* * * * *